(12) United States Patent
Gregoris

(10) Patent No.: US 7,218,378 B2
(45) Date of Patent: May 15, 2007

(54) DIGITAL IMAGE PROCESSING SYSTEM

(75) Inventor: Giuseppe Gregoris, Azzano Decimo (IT)

(73) Assignee: GPE SRL, Azzano Decimo (IT)

( * ) Notice: Subject to any disclaimer, the term of this patent is extended or adjusted under 35 U.S.C. 154(b) by 0 days.

(21) Appl. No.: 10/307,207

(22) Filed: Nov. 27, 2002

(65) Prior Publication Data

US 2003/0133717 A1 Jul. 17, 2003

(51) Int. Cl.
*G03B 27/52* (2006.01)

(52) U.S. Cl. .............................. 355/40; 355/67; 355/71; 347/232; 358/471

(58) Field of Classification Search ................... 355/40, 355/41, 72–75, 77, 69, 71; 347/232; 358/471
See application file for complete search history.

(56) References Cited

U.S. PATENT DOCUMENTS

| | | | | |
|---|---|---|---|---|
| 4,230,408 A | * | 10/1980 | Nigg | 355/35 |
| 5,701,185 A | | 12/1997 | Reiss et al. | 358/471 |
| 5,706,075 A | * | 1/1998 | Ishikawa et al. | 355/35 |
| 5,844,663 A | | 12/1998 | Holley et al. | 355/32 |
| 6,081,346 A | * | 6/2000 | Terajima et al. | 358/296 |
| 6,243,122 B1 | * | 6/2001 | Nakamura et al. | 347/232 |
| 6,292,251 B1 | | 9/2001 | Holley et al. | 355/32 |
| 6,580,490 B1 | * | 6/2003 | Wong et al. | 355/40 |
| 2003/0035123 A1 | * | 2/2003 | Ramanujan et al. | 358/1.4 |
| 2004/0233406 A1 | * | 11/2004 | Lan et al. | 355/53 |

FOREIGN PATENT DOCUMENTS

EP 0987875 A1 * 3/2000

OTHER PUBLICATIONS

Standard Search Report, EPO, dated Jul. 10, 2002.
AAA Imaging & Supplies, "D Carrier" News Release dated Aug. 1, 2001.
Photo Marketing Association International, "Industry Notes" dated Aug. 22, 2001.
Photo Industry Reporter, "Dollars from Digital, Looking for a Low–Cost Digital Minilab" dated Aug. 2, 2002.
WWW.ATECH.CO.UK, "GPE D–Carrier" retrieved on Jul. 9, 2002.
WWW.FOTOTECBAJA.COM. "Digital Carrier" retrieved on Jul. 9, 2002.
WWW.MONSMEDIUS.RO, "Digital Carrier" retrieved on Jul. 9, 2002.
WWW.FOTONOTIZIARIO.IT, "D–Carrier" retrieved on Jul. 9, 2002.
WWW.BRASILLAB.COM, "Digital Carrier" retrieved on Jul. 9, 2002.
PCT International Preliminary Examination Report (Int'l. Appl. No. PCT/EP 02/12676).

* cited by examiner

*Primary Examiner*—D. Rutledge
(74) *Attorney, Agent, or Firm*—Knobbe, Martens, Olson & Bear LLP

(57) ABSTRACT

Photographic prints are produced from a virtual negative image on photographic paper. An image formation device coupled with a source of virtual negative images and a displacement actuator coupled with the image formation device are provided. The image formation device is positioned in a first position. A group of pixels on the image formation device that correspond to a portion of the virtual negative image is illuminated. The photographic paper is exposed to the group of pixels by directing a light beam from a lamp along an optical path. Relative motion is provided between the image formation device and an exposure target. A group of pixels on the image formation device that corresponds to a portion of the virtual negative image is illuminated. The photographic paper is exposed to the group of pixels by directing the light beam from the lamp along the optical path.

24 Claims, 11 Drawing Sheets

DIGITAL IMAGE PROCESSING SYSTEM

PRIORITY INFORMATION

This application is based on and claims priority to Italian Patent Application No. PN2001A000084, filed Nov. 29, 2001, the entire contents of which is hereby expressly incorporated by reference.

BACKGROUND OF THE INVENTION

1. Field of the Invention

This application describes and claims an apparatus for producing photographic prints from digital photographic images.

2. Description of the Related Art

Photographic printers, or "mini-labs," are used to produce photographic prints on photographic paper from a photographic negative. Typically photographic negatives are formed at discrete locations on a continuous web of film when the film is exposed in a camera and subsequently developed. The web of film carrying the negatives is then placed in a photographic printer between a light source and the photographic paper. The photographic negative allows light from the light source to pass through the negative that corresponds to the inverse of the image on the negative. The photographic paper is thus exposed to the light, which is the first step in forming a photographic image on the photographic paper. The photographic printer mechanically engages the web of film and mechanically advances it sequentially through a series of neighboring negatives. Film and film processing represent a significant cost of photography. Mechanical handling of film adds even more cost and complexity to photographic print production.

In recent years, cameras have become available that do not use film, and thus reduce the cost and the complexity of photography to the photographer. Such cameras, commonly referred to as "digital cameras," store photographic images electronically. Although digital cameras have grown in popularity, the quality of the images captures by such cameras, and the prints produced therefrom, has been generally been inferior to those produced by film-based cameras. The lower image quality is partly due to the abrupt transition from one neighboring image capturing element, called a "pixel," to the next. One trend to improve digital photographic images has been to increase the resolution, measured by the number of pixels used to capture the image. As the density of pixels increases, the transition from one pixel to the next becomes less noticeable to the eye, and the image quality improves.

While digital cameras eliminate the need for film, the process of producing photographic prints from electronically stored photographic images is more complex than film-based print production, in part because standard mini-labs are not capable of handling digital photographic images. Currently such images are printed by individual photographers using a computer and associated peripheral equipment, e.g., a color printer. The cost of buying a computer and the associated peripheral equipment to print digital photographic images from the digital camera is prohibitive. While digital mini-labs could be produced for photographic printing services, such mini-labs would be extremely expensive, would not be capable of processing film-based negatives, and would not make use of existing mini-lab equipment.

SUMMARY OF THE INVENTION

In one embodiment, a method is provided for producing a photographic print from a virtual negative image, i.e., binary-coded data that represents a photographic image captured, for example, by a digital camera. The virtual negative image is stored in a source of virtual negative images. A mini-lab is provided that has a lamp capable of directing a light beam along an optical path. Also provided are a color filtering device, an image formation device coupled with the source of virtual negative images, a displacement actuator coupled with the image formation device, an exposure target, and a shutter. At least a portion of each of the lamp, the color filtering device, and the image formation device is positionable in the optical path of the light beam. The image formation device is positioned in a first position. A first sub-image of the virtual negative image is provided to the image formation device. The photographic paper is exposed to the first sub-image by directing the light beam from the lamp along the optical path. Relative motion is provided between the image formation device and the exposure target. A second sub-image of the virtual negative image is provided to the image formation device. The photographic paper is exposed to the second sub-image by directing the light beam from the lamp along the optical path.

In another embodiment, a method of a producing photographic print is provided. The photographic prints are produced from a virtual negative image stored in a source of virtual negative images. A mini-lab that has a lamp, a color filtering device, an image formation device, a displacement actuator, an exposure target, and a shutter is provided. The lamp is directs a light beam along an optical path. The image formation device has an array of pixels. The image formation device is coupled with the source of virtual negative images. The displacement actuator is coupled with the image formation device. At least a portion of each of the lamp, the color filtering device, the image formation device, and the exposure target is positionable in the optical path of the light beam. The image formation device is positioned in a first position. A group of pixels on the image formation device that correspond to a portion of the virtual negative image is illuminated. The photographic paper is exposed at the exposure target to the group of pixels by directing the light beam from the lamp along the optical path. Relative motion is provided between the image formation device and the exposure target. A second group of pixels on the image formation device that corresponds to a second portion of the virtual negative image is illuminated. The photographic paper is exposed at the exposure target to the second group of pixels by directing the light beam from the lamp along the optical path.

In another embodiment, a digital image processing system includes a printing and developing apparatus, a computer, a digital image handler, and a controller. The printing and developing apparatus receives photographic paper and positions the photographic paper at an exposure target. The printing and developing apparatus has a lamp adapted to direct a light beam toward the photographic paper. The computer receives a virtual negative image. The digital image handler is connected to the computer and receives therefrom the virtual negative image. The digital image handler includes a color filtering device, an image formation device, a displacement actuator coupled with the image formation device, and a shutter spaced from the color filtering device. The displacement actuator moves the image formation device with respect to the exposure target. The shutter is actuatable from a first operating position, wherein the light beam is blocked, to a second operating position, wherein the light beam is not blocked. The controller is connected to the computer and is capable of receiving user input.

In another embodiment, a method of assembling a photographic printing assembly is provided. A mini-lab is provided that has a lamp. The mini-lab is capable of producing a photographic print from a negative image on developed film. A digital image handler that includes an image formation device and a displacement actuator is provided. The displacement actuator is coupled with the image formation device. The displacement actuator moves the image formation device with respect to the lamp. The mini-lab and the digital image handler are connected to a computer, whereby a virtual negative image stored in the computer is provided to digital image handler.

DETAILED DESCRIPTION OF THE PREFERRED EMBODIMENT

Figure 1:
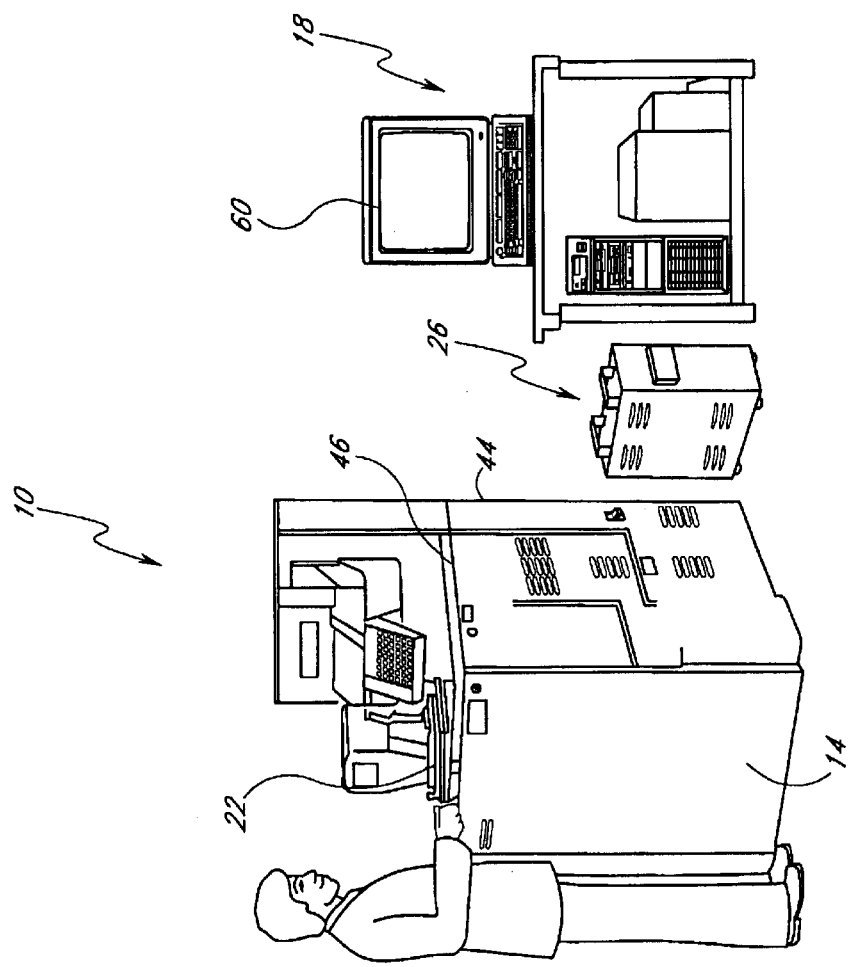
FIG. 1 is a schematic diagram illustrating one embodiment of a digital image processing system.
Figure 1:
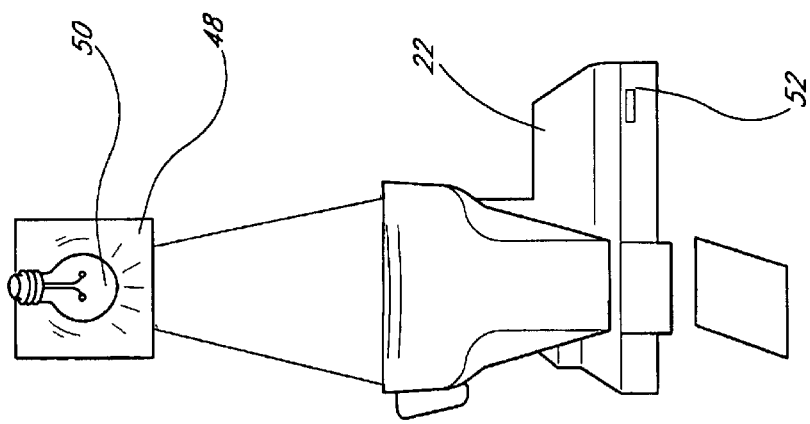
Figure 2:
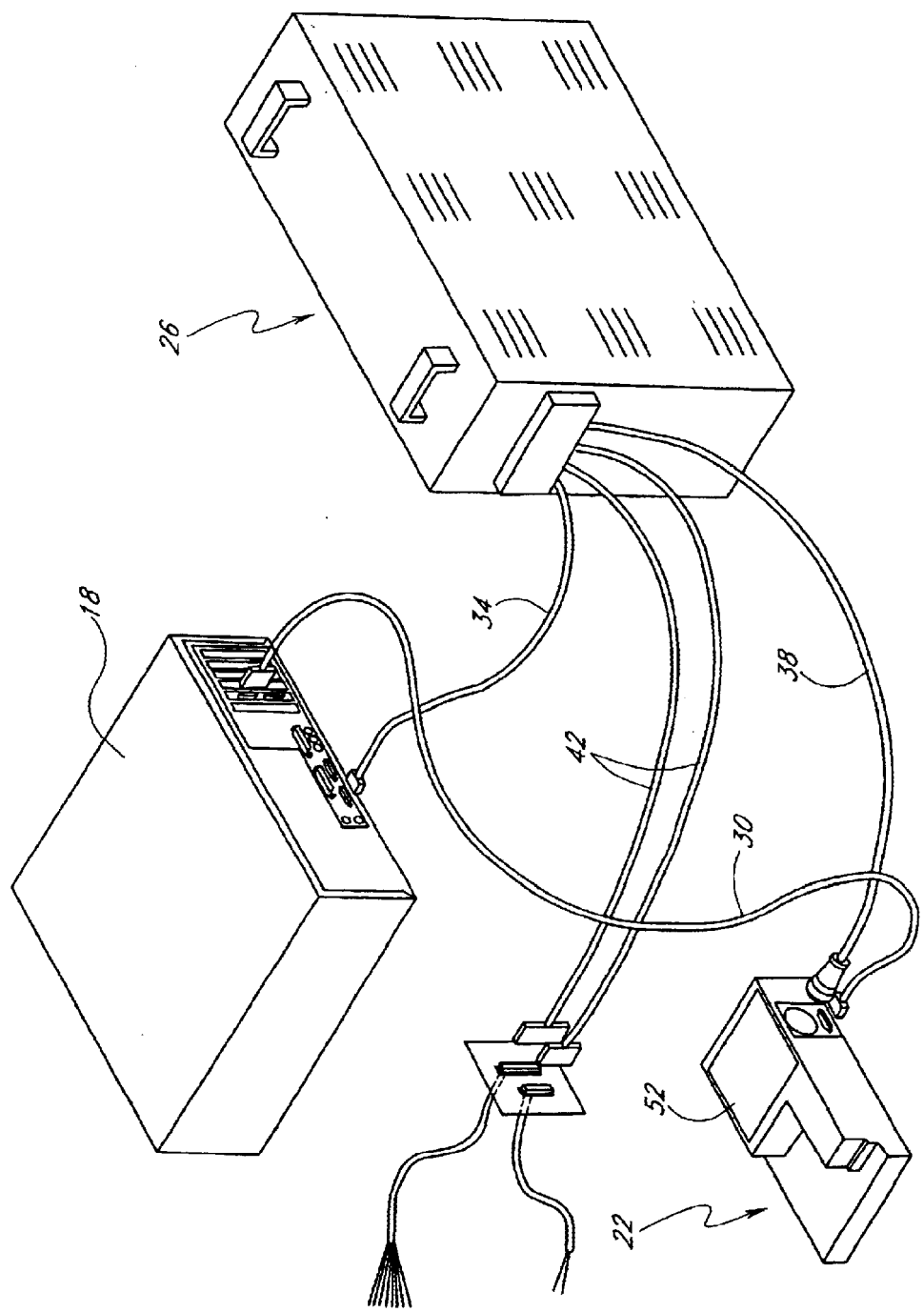
FIG. 2 is a perspective view of the interconnection of various components of the digital image processing system of FIG. 1.
Figure 8:
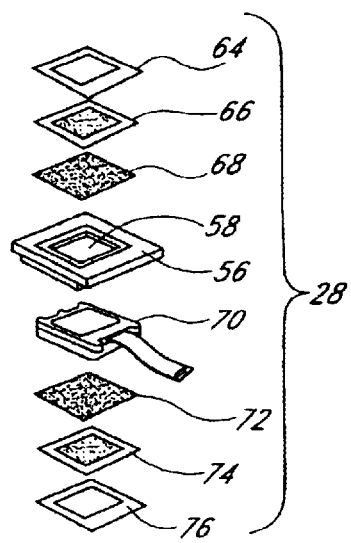
FIG. 8 is a perspective exploded view of one embodiment of an optics system that forms the digital images to be printed by the digital image processing system.

FIGS. 1 and 2 show one embodiment of a digital image processing system 10 that includes a mini-lab 14, a data processing device 18 (e.g., a personal computer), a digital image handler 22, and a mini-lab controller 26. A serial cable 30 interconnects the digital image handler 22 and the personal computer 18. A serial cable 34 interconnects the personal computer 18 and the mini-lab controller 26. Another serial cable 38 interconnects the digital image handler 22 and the mini-lab controller 26. Two serial cables 42 connect the mini-lab controller 26, either directly or through interface board, to an user interface, e.g., a keyboard (not shown), associated with the mini-lab 14. The digital image processing system 10 also includes an optics system 28, one embodiment of which is illustrated in FIG. 8.

The mini-lab 14 illustrated in FIG. 1 comprises a printing and developing apparatus 44, or printer, that is provided with photographic paper. The photographic paper is exposed, as discussed below, to virtual negative images to create positive images on the photographic paper. The printing and developing apparatus 44 includes an upper surface 46 and a lighting unit 48. The lighting unit 48 includes a lamp 50 that is positioned to direct a light beam along an optical path toward the photographic paper, as described more fully below. The printing and developing apparatus 44 of the mini-lab 14 develops the exposed photographic paper to make the positive prints visible to the eye. The digital image handler 22 is configured to be mounted on the mini-lab 14 so that positive prints, e.g., color photographic prints or black-and-white photographic prints, can be produced from virtual negative images.

In one embodiment, the digital image handler 22 comprises a housing 52 that is compatible with a conventional mini-lab 14. That is, the housing 52 is sized and shaped to be mounted on the upper surface 46 of the mini-lab 14 where at least a portion of the digital image handler 22 is positioned in the optical path of the light beam. While the digital image handler 22 is compatible with a conventional mini-lab 14, i.e., one that can produce photographic prints from a negative formed on a web of film, the digital image handler 22 is not limited to any one size, shape, or configuration of a mini-lab. Rather, the digital image handler 22 is compatible with a wide variety of mini-labs produced by a variety of manufacturers in its various embodiments. In one embodiment, the housing 52 is shaped as a parallelepiped.

In one embodiment, the housing 52 is formed as a parallelepiped and includes a frame 54 to which various components of the digital image handler are mounted and a cover 56 mounted on the frame 54. In one embodiment, the cover 56 has a recessed portion on an upper surface thereof, wherein an aperture 58 is formed. As discussed more fully below, the aperture 58 is located in the optical path of the beam of light produced by the lamp 50. The housing 52 also includes apertures through which the serial cables 30, 38 can extend to engage serial cable sockets. As discussed above, the digital image handler 22, the personal computer 18, and the mini-lab controller 26 are operationally connected thereby (see FIG. 2).

As discussed more fully below, the personal computer 18 is provided to process binary-coded data that represents a photographic image captured, for example, by a digital camera. This binary-coded data is referred to herein as a "virtual negative image." The virtual negative image is used by the digital image processing system 10 to generate photographic prints, as directed by the personal computer 18. For example, in some embodiments the personal computer 18 selects the type and number of prints to be produced from a virtual negative image. In some embodiments, the characteristics of the photographic print are varied, e.g., the desired brightness and color (hue, saturation, gradation, sharpness, etc.). The personal computer 18 can also direct the digital image processing system 10 to vary the size of the photographic print and to add special features and special effects to the photographic print as may be desired.

As is known, the personal computer 18 generally includes a central processing unit ("CPU"), data storage, and a variety of computer programs. The personal computer 18 is provided with a digital image processing program that processes the virtual negative images and thereby controls, to a great extent, the nature of the photographic prints derived therefrom. For example, the digital image processing program advantageously allows the user to alter a virtual negative image as desired before a photographic image thereof is printed. Thus, as discussed above, special effects can be achieved, e.g., the image can be enlarged, particular features or portion of the image can be emphasized, and the image can be altered to eliminate defects (i.e., retouched). One skilled in the art will recognize that other alterations to the image are possible and may be desired by an operator of the digital image processing system 10.

The digital image processing system 10 is very flexible in that each customer can select special effects, as discussed above, to be applied to the virtual negative image prior to printing. These effects need not affect the original digital image captured, and thus can be de-selected with ease. The operator of the digital image processing system 10 can also control, as may be requested by a customer or as may be dictated by convenience, a selected arrangement or printing order, format and size of the printed photograph, number of copies to be printed, etc. Also, multiple orders can be set for the production of photographic prints from the virtual negative images with only limited operator intervention. For example, one or several photographic printing orders can be processed at a time, either automatically or manually. Alternately, a sequence of separate orders can be arranged by the personal computer 18 to be carried out by the digital image processing system 10, as discussed below.

In one embodiment, the personal computer 18 is connected to a video display 60 upon which the virtual negative image can advantageously be displayed. The digital image processing program that runs on the personal computer 18 and that controls the digital image processing system 10 advantageously allows the user to alter the virtual negative images as desired before the printing thereof. Thus, special effects can be achieved, e.g., enlargements, particular features or items to be specially emphasized in the photographic prints, photo-retouches, and any other special effect that may be requested by the customer or customers for the final prints. The desired special effects can be selected by each customer. The operator can also control, as may be requested by the customer or as may be dictated by convenience, a selected arrangement or printing order, format and size of the printed photograph, number of copies to be printed, etc.

Also, multiple orders can be set for the development and printing of the virtual negative images. Thus, one or several development and printing orders can be processed at a time, either automatically or manually. Alternately, a sequence of separate orders can be processed by the same personal computer 18, and such an execution of the related development and printing orders as commanded in the personal computer 18 is carried out through the digital image handler 22, to which the virtual negative images are selectively sent by the personal computer 18. The digital image handler 22 handles the virtual negative images in the manner that will be described to greater detail below to produce photographic prints corresponding to the virtual negative images.

Referring now to FIG. 1, in one embodiment, the housing 52 of the digital image handler 22 is associated with the upper surface 46 of the printing and developing apparatus 44 of the mini-lab 14, at least partially in the optical path of the light beam produced by the lamp 50 of the lighting unit 48. As discussed above, the lamp 50 directs a light beam along an optical path, through the optics system 28. The lamp 50 thereby illuminates a virtual negative image formed in the optics system 28, which is then projected onto the photographic paper, as described more fully below. The formation of the virtual negative image in the optical path of the light beam is discussed more fully below. In one embodiment, the housing 52 also encloses many of the components of the optics system 28.

Figure 5:
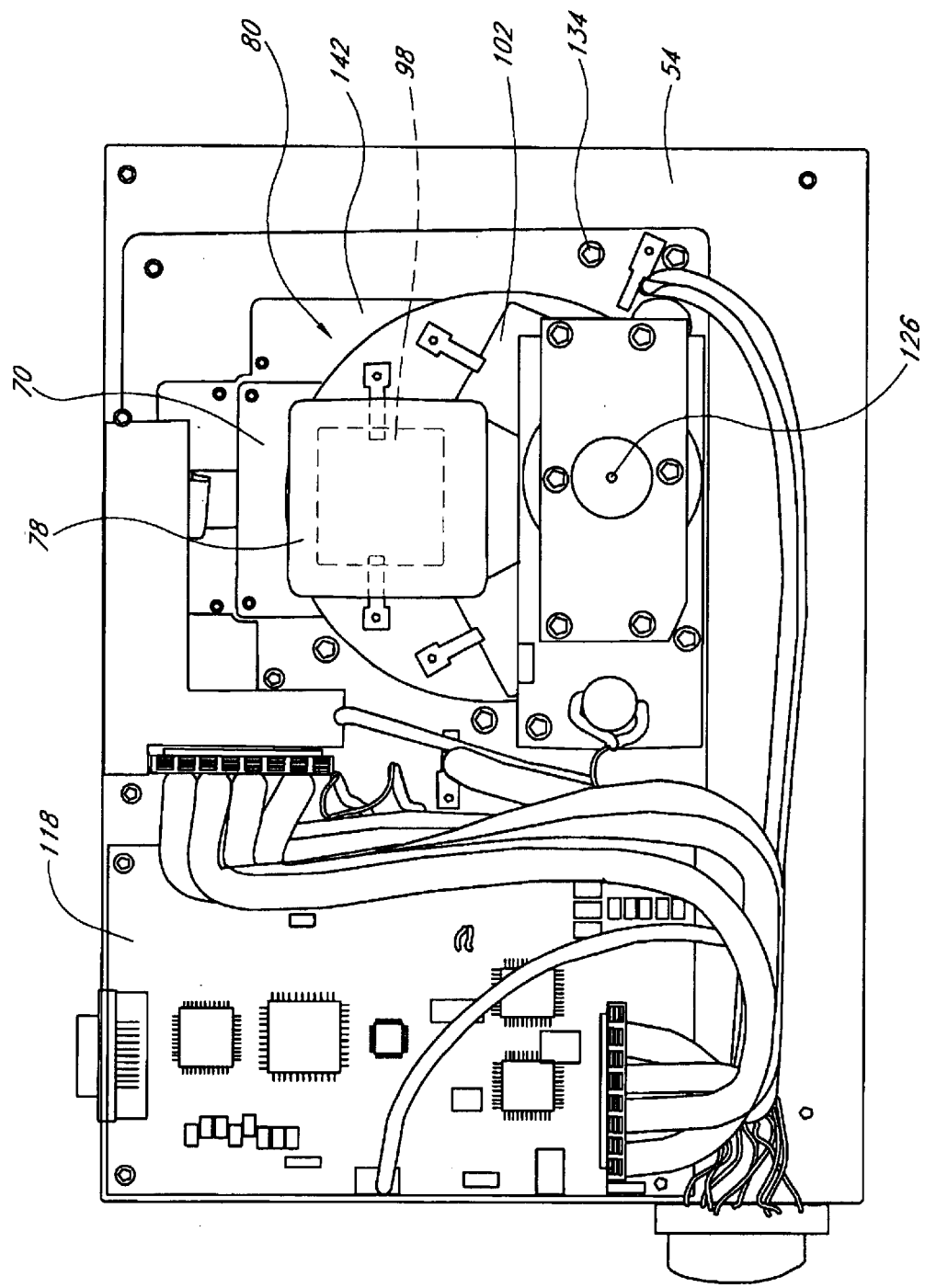
FIG. 5 is a top view of the digital image handler, similar to that of FIG. 4, showing one embodiment of a shutter in a first operating position.
Figure 6:
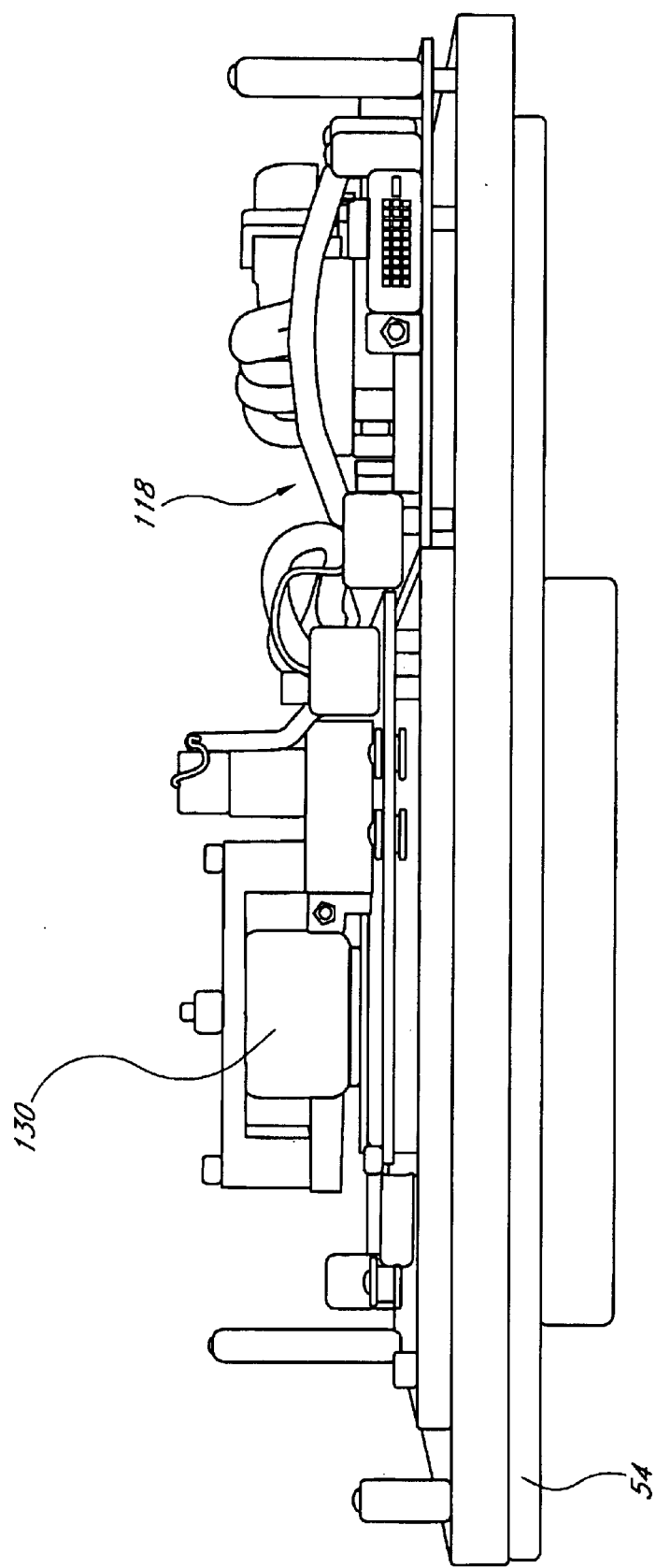
FIG. 6 is a front view of the digital image handler of FIG. 3, with the cover of the housing removed.
Figure 9:
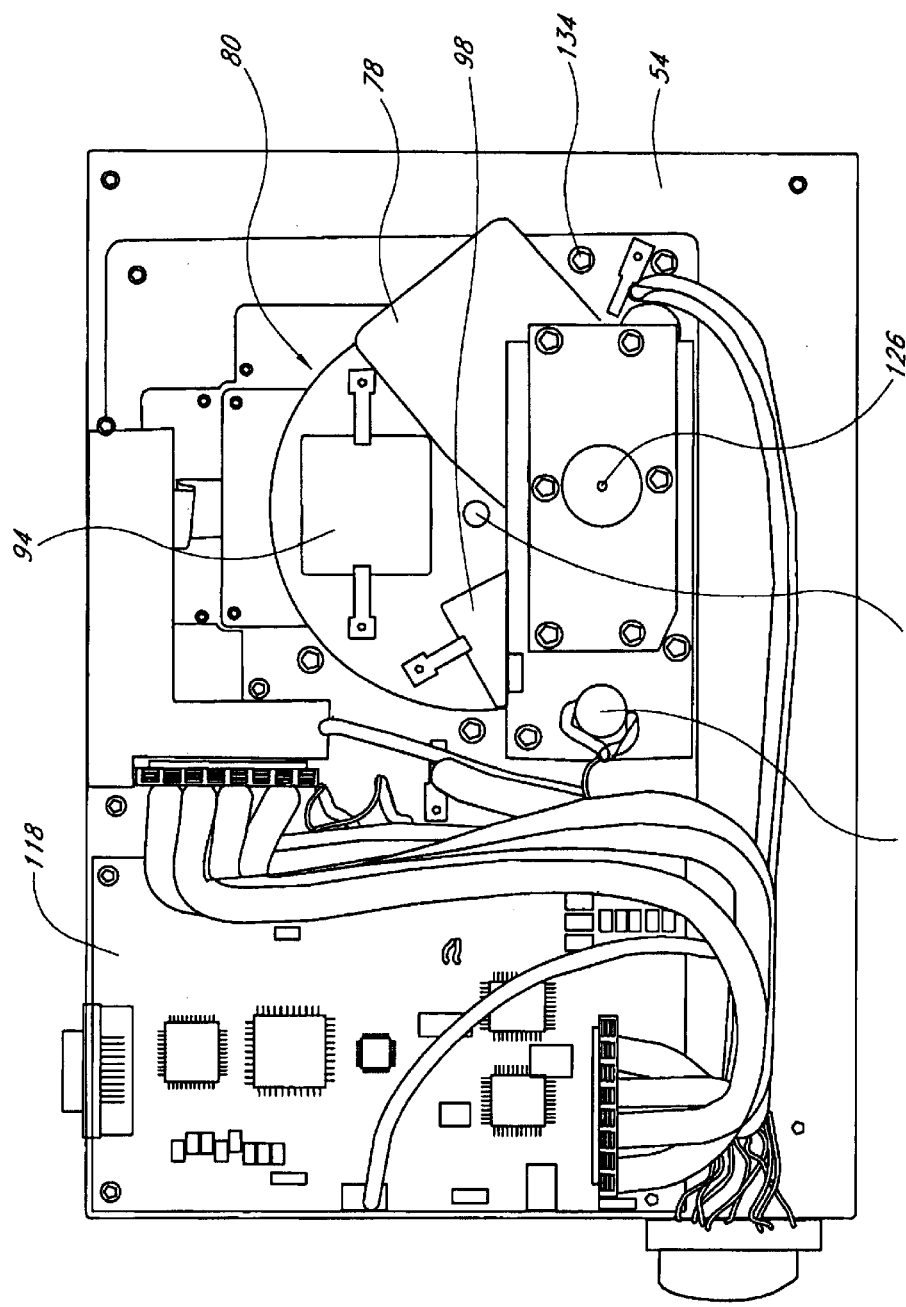
FIG. 9 is a top view of the digital image handler, similar to that of FIG. 4, showing the shutter displaced into a second operating position.

FIG. 8 is an enlarged exploded view of one embodiment of the optics system 28. In one embodiment, the optics system 28 includes a first sealing member 64, a first heat filter 66, a first polarizing filter 68, an image formation device 70, a second polarizing filter 72, a second heat filter 74, and second sealing member 76. The optics system 28 also includes a moving diaphragm or shutter 78, a color filtering device 80 (shown in FIGS. 4–5 and 9, 10, and 12), and a pixel rounding-off device 82 (shown in FIGS. 7 and 12). As described below, the shutter 78 in configured to be movable between a first operating position, wherein the optical path is blocked (shown in FIG. 5) and a second operating position, wherein the optical path is not blocked (shown in FIG. 9), as discussed more fully below.

Each of the components of the optics system 28 are located in the optical path of the light beam. However, the arrangement and location of the components of the optics system 28 can vary. In one embodiment, the first sealing member 64, the first heat filter 66, and the first polarizing filter 68 are located above the aperture 58, as indicated by the position of the aperture 58 in FIG. 8. However, the optics system 28 need not be entirely contained in the housing 52. The heat filters 66, 74 absorb ultraviolet and infrared radiation in the optical path, thereby preventing other components of the optics system 28 or the digital image handler 22 from getting too hot.

The image formation device 70 is a structure in which the virtual negative images are formed. In one embodiment, the image formation device 70 is a liquid-crystal display ("LCD") device. Other image formation devices can also be used, as will be understood by one skilled in the art. As discussed above, the virtual negative image is provided to the image formation device 70 by the personal computer 18 in one embodiment. The personal computer 18 is thus a source of virtual negative images. A digital camera could also be a source of virtual negative images. Alternatively, any data storage device that is capable of transferring virtual negative images to the digital processing system 10 could be a source of virtual negative images.

The color filtering device 80 can take many forms. In one embodiment, shown in FIGS. 4–5 and 9, 10, and 12, the color filtering device 80 is a filter wheel that has a first dichroic printing filter 94, a second dichroic printing filter 98, and a third dichroic printing filter 102. In one embodiment, the filters, 94, 98, 102 are spaced out equally around the filter wheel. In one embodiment, the dichroic filter 94 is a red filter, the dichroic filter 98 is a green filter, and the dichroic filter 102 is a blue filter. In one embodiment, the filter wheel 80 is driven rotatably by a motor 104, which is a stepper motor in one embodiment. Further details of the operation of the filter wheel are discussed below.

Figure 7:
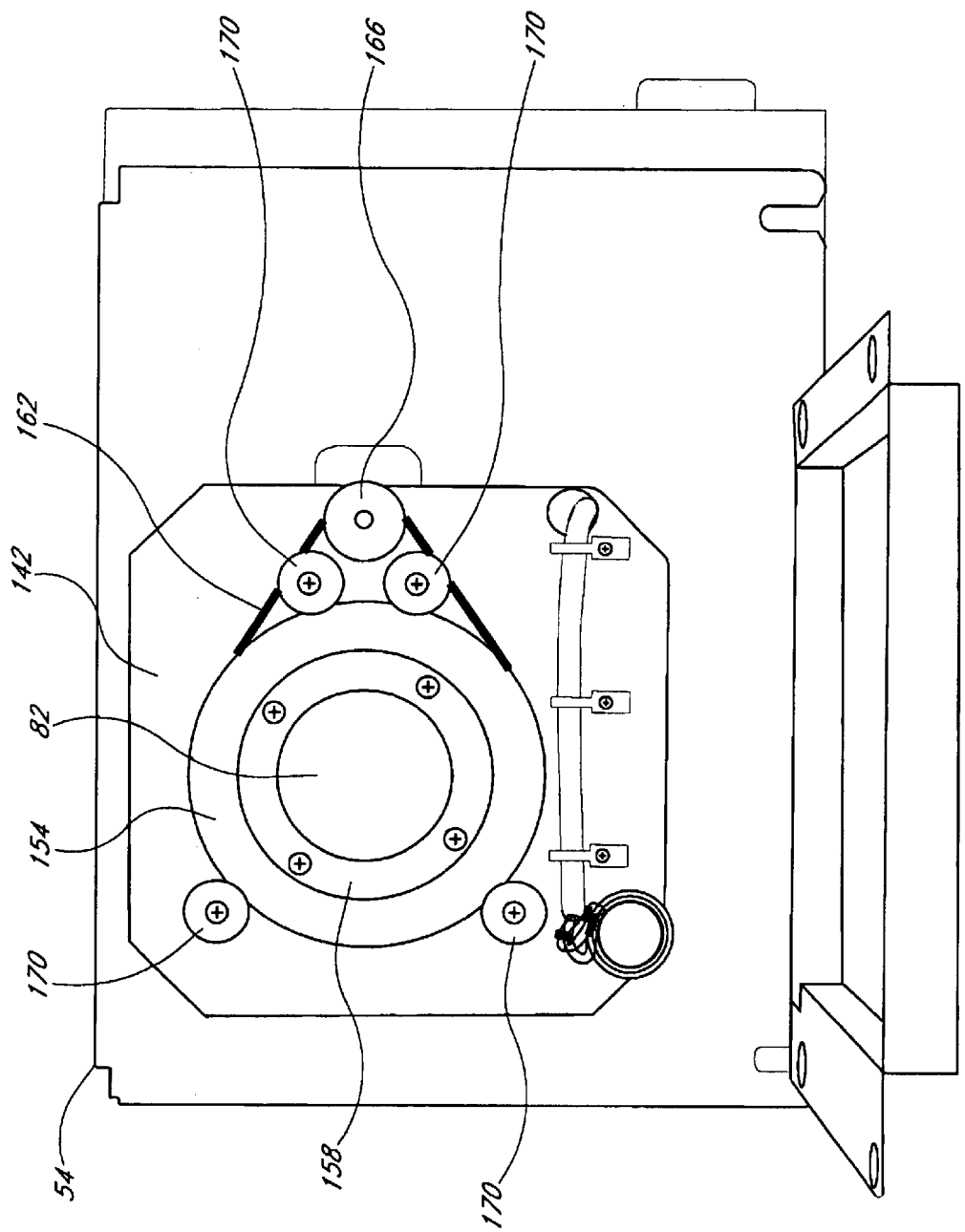
FIG. 7 is a bottom view of the digital image handler of FIG. 3.
Figure 12:
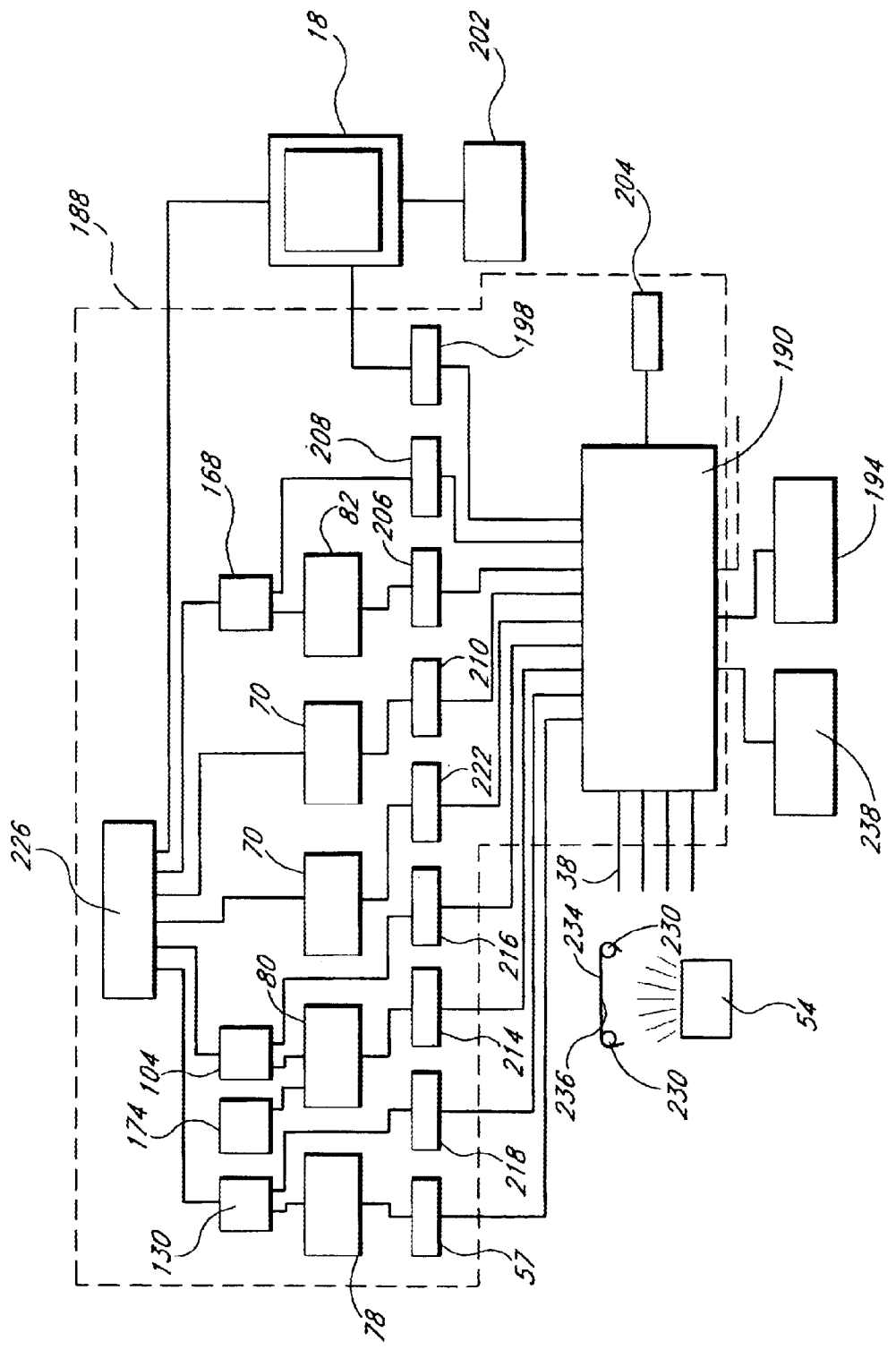
FIG. 12 is a schematic diagram illustrating the interconnection of electrical components provided in one embodiment of the digital image processing system.

In one embodiment, the pixel rounding-off device 82, also called a de-pixelizer 82, shown in FIGS. 7 and 12, is a rotating inclined glass that operates in a manner described below. The pixel rounding-off device 82 is only slightly inclined in one embodiment. Preferably the glass of the pixel rounding-off device 82 is a non-reflecting glass. Thus, the pixel rounding-off device 82 takes the square look of the pixels and makes them round.

As discussed above, the components of the optics system 28 are arranged so that the light beam generated by the lighting unit 48 passes in a sequence through the first sealing member 64, the first heat filter 66, and the first polarizing filter 68. In the embodiment of FIG. 8, the light beam then passes through the aperture 58 of the digital image handler 22. After passing into the digital image handler 22, the light beam passes through the image formation device 70, the second polarizing filter 72, the second heat filter 74, and the pixel rounding-off device 82. The light beam then passes by the shutter 78 when the shutter 78 is in the second operating position, i.e., the non-blocking position. Then the light beam passes through the color filtering device 80, as described more fully below.

Figure 3:
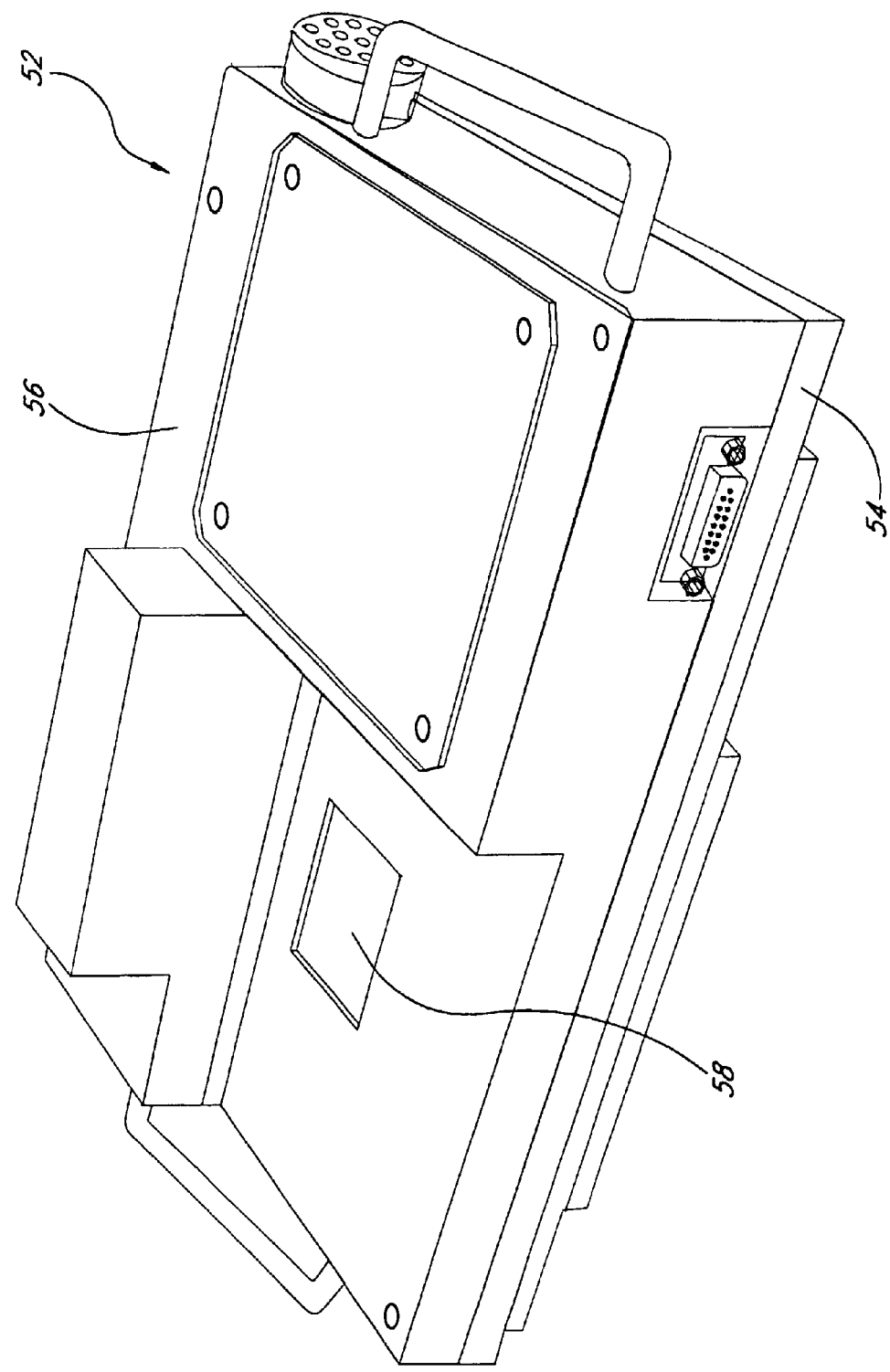
FIG. 3 is an enlarged front perspective view of one embodiment of a digital image handler of the digital image processing system of FIG. 1.
Figure 4:
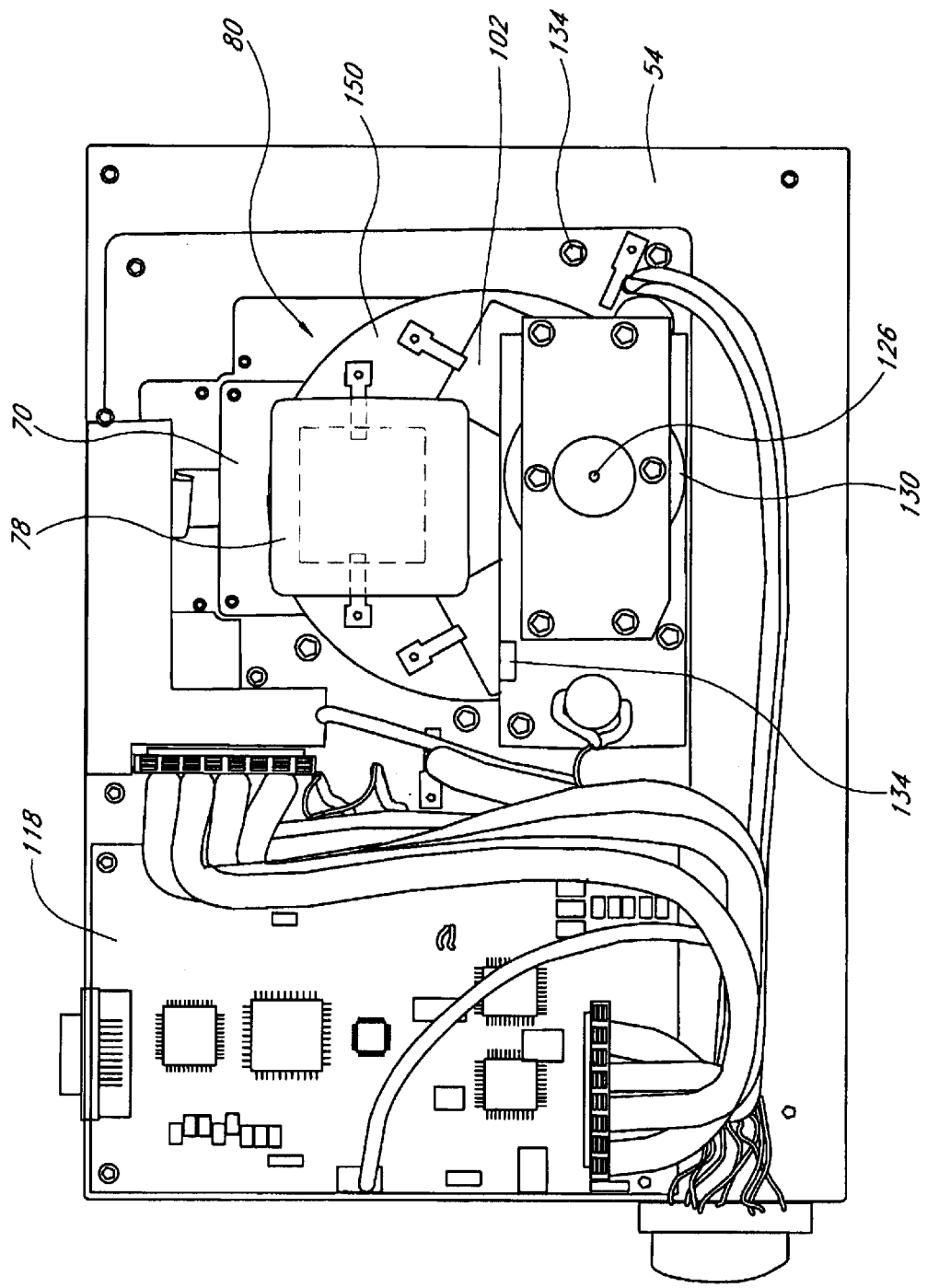
FIG. 4 is a top view of the digital image handler of FIG. 3, with a cover of a housing removed to show certain internal components thereof.

FIGS. 3 through to 7 illustrate further features of the digital image handler 22. The frame 54 of the housing 52 preferably is formed in the general shape of a parallelepiped, is relatively thin, and is constructed of metal, plastics or any other suitable material. At least a portion of the optics system 28, as discussed more fully above, is desirably located in a cavity (not shown) at least partially defined by the frame 54 that extends from the aperture 58 on the top side of the digital image handler 22 to the bottom side of the digital image handler 22. In the illustrated embodiment, the cavity and the aperture 58 are provided on the left side of the housing 52 (when viewed from the front side). The digital image handler 22 also comprises a circuit board 118 that is provided on the frame 54 of the housing 52. The circuit board 118 is electrically connected to a driver circuit of the image formation device 70.

The shutter 78 is in the shape of a parallelepiped and is coupled at an end portion thereof with a vertical shaft 126 journaled on the frame 54. In one embodiment, the shutter 78 is mounted on the shaft 126 so as to be spaced a small distance (e.g., spaced vertically a small distance) from the color filtering device 80 (which may be a filter wheel), and is configured to extend horizontally to such an extent as to cover completely the dichroic filters 94, 98, 102 of the filter wheel during the rotation thereof. The shaft 126 and the shutter 78 mounted thereon are operated by an electromagnet 130 that rotates the shutter 78 along an arcuate path by a pre-determined angle and in a pre-determined direction of rotation. A pair of fixed stops 134 delimit end-of-travel positions of the shutter 78, in one embodiment. (See FIG. 9.) In this way, the shutter 78 can be moved from the first operating position, shown in FIG. 5, to the second operating position, shown in FIG. 9. In the first operating position, the shutter 78 coincide with the optical path of the light beam. In the first position, the shutter 78 blocks the passage of the light beam and thereby prevents exposure of the photographic paper by the light beam. In the second operating position, the shutter 78 is moved away from the optical path of the light beam. In the second position, the light beam can pass beyond the location of the shutter 78 to the photographic paper, whereby the photographic paper is exposed to the light beam and the image contained therein.

The electromagnet 130 is electrically connected to a control circuit (discussed below) that directs a short electric pulse to the electromagnet 130, i.e., energizes the electromagnet 130. When energized, the electromagnet 130 causes the shutter 78 to be displaced, i.e., moved from the first operating position to the second operating position. As discussed above, the shutter 78 abuts against the corresponding stop 134 and remains in this position for an exposure time, i.e., the time required to adequately expose the photographic paper to the image bearing light. After such time, the short electric pulse is removed, e.g., by de-energizing the electromagnet 130, whereby the shutter 78 moves back into the first operating position.

In one embodiment where the color filtering device 80 is a filter wheel, the filter wheel 80 is supported by a plate 142, which is quadrangular in one embodiment, and which is attached to the frame 54 in the recessed portion thereof. The filter wheel 80 is mounted on a shaft 146 that is journaled for rotation on the plate 142. The filter wheel 80 also includes a generally planar top surface 150 that is arranged opposite to and slightly spaced from a bottom surface of the shutter 78. The planar top surface 150 is provided with seats, i.e., depressions, arranged to accommodate the colored dichroic filters 94, 98, 102. The seats are formed so that when the dichroic filters 94, 98, 102 are positioned therein, the exposed top surfaces of the filters 94, 98, 102 are flush (i.e., on the same level) with the planar top surface 150.

The digital image handler 22 also includes an outer bushing 154 and an inner bushing 158 that are coupled with the frame 54. The bushings 154, 158 are cylindrical and are concentric in their arrangement. The inner bushing 158 is connected to the pixel rounding-off device 82. The bushings 154, 158 are driven to rotate continuously in a single direction of rotation by a drive belt 162 that passes around the circumference of the outer bushing 154 and a driving pulley 166. The driving pulley 166 is journaled for rotation on the plate 142 and is driven by a motor 168. The drive belt 162 is guided along by a set of idler rollers 170.

The above-described components operate together to expose photographic paper to the virtual negative image. For example, in one embodiment, the rotation of the filter wheel 80 causes the colored filters 94, 98, 102 to be sequentially displaced with respect to the optical path of the light beam. When one of the filters 94, 98, 102 is displaced to coincide with the optical path of the light beam, the rotation of the filter wheel 80 is temporarily stopped and the shutter 78 is actuated, i.e., moved, from the first operating position to the second operating position. As discussed above, the shutter 78 is moved away from the optical path of the light beam in the second operating position, so that the light beam is not blocked by the shutter 78. The virtual negative image is thereby projected through the filters onto the photographic paper, whereby the photographic paper is exposed.

Figure 10:
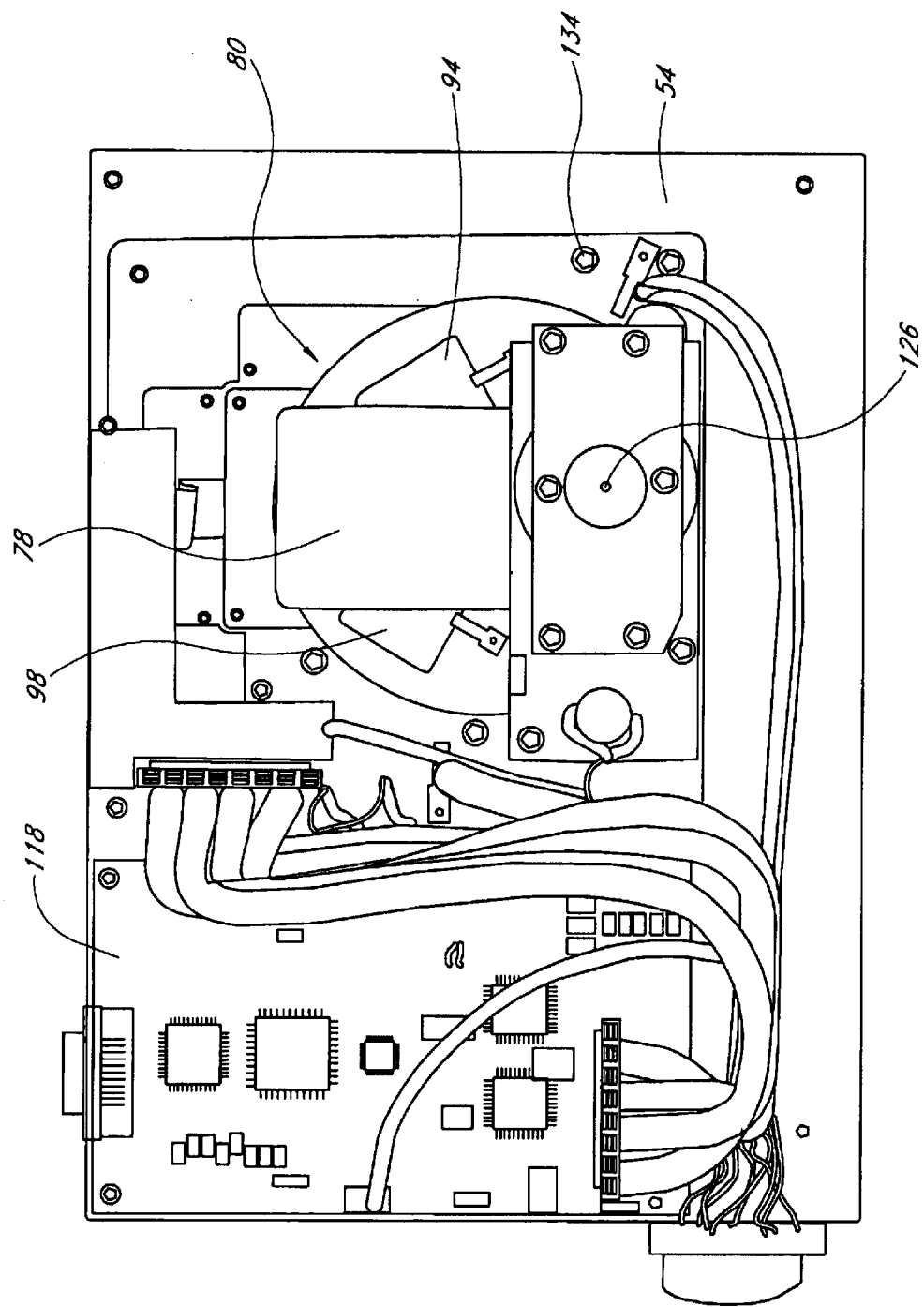
FIG. 10 is a top view of the digital image handler, similar to that of FIG. 4, showing one embodiment of a filter wheel rotated to a position different from that shown in FIG. 4.

At the end of such an operation, the shutter 78 is moved back into the first operating position where the passage of the light beam is blocked. The filter wheel 80 is then rotated in the same direction of rotation as described above until the next colored filter is moved into the optical path of the light beam. FIG. 10 illustrates the filter wheel 80 being moved from a position where one of the filters 94, 98, 102 has been interposed in the optical path of the light beam, exposure has occurred, and the filter wheel 80 is being advanced to the next one of the filters 94, 98, 102. As can be seen, the shutter 78 is in the first operating position while the filter wheel 80 is being advanced. Then, the rotation of the filter wheel 80 is again stopped and the shutter 78 is moved to the second operating position, whereby the light beam is allowed to pass through the corresponding dichroic filter and the photographic paper is exposed to the light beam bearing the virtual negative digital.

Finally, following the same operational sequence the last colored filter of the filter wheel 80 is first brought into the position corresponding to the optical path of the light beam and then moved away therefrom. Accordingly, the photographic paper is exposed to three different images colored in the three primary colors, i.e. red, green and blue, that are superimposed upon each other. By combining these three images together, the virtual negative image is imprinted upon the photographic paper and is given the coloring of the photographic image, with the hues, saturation, gradations, sharpness, brightness, etc. as actually picked up from the original scene or object.

In one embodiment, a potentiometer 174 is provided to control the rotation of the filter wheel 80. Of course, one skilled in the art will appreciate that other control devices can be provided as well, so long as the positioning of the filter wheel 80 can be controlled with sufficient precision. The potentiometer 174 is electrically connected to the control circuit 188 and arranged in the rotation path of the filter wheel 80 so as to interact therewith. Preferably the potentiometer 174 identifies precisely the initial position of the filter wheel 80 and the various angular displacements thereof. Data gathered by the potentiometer 174 are used to cause the filter wheel 80 to be moved sequentially from filter to filter, as described above.

The pixel rounding-off device 82 creates the effect of "shading off" the gaps, i.e. the void intervals existing between the various pixels, thereby bringing about an optical effect of continuity among the pixels. The "shading off" considerably improves the quality of the resulting virtual image and, therefore, also the image of the photographic print. In one embodiment, the pixel rounding-off device 82 is a continuous rotating inclined glass.

As discussed above, one embodiment of the image formation device 70 is an LCD device. In one embodiment, the LCD device is provided with an array of pixels that are closely spaced apart. The array of pixels is arranged in rows and columns, and taken together, the array forms the virtual negative image in one embodiment. One LCD device advantageously has a 1280×1024 array of pixels. Each of the pixels is driven by a video driver that is electrically connected to a video board of the computer 18. The LCD device thus receives a virtual negative image from the computer 18 corresponding to each photograph to be printed.

In response to input data from the computer 18, the LCD device illuminates all corresponding pixels with an intensity that is proportional to the characteristics of the virtual negative image. The virtual negative image is thereby formed in the LCD device for subsequent illumination of the virtual negative image by the light beam of the lighting unit 48 and the resulting creation of the photographic prints in the manner described above.

During the formation of the virtual image, the image formation device 70 is moved by one or more displacement actuators, e.g., a set of piezo-electric actuators (not shown), that are operationally connected to the mini-lab controller 26 of the digital image processing system 10. In one embodiment, the actuators are arranged around the periphery of the image formation device 70, and are adapted to act on the periphery of the image formation device 70. The actuators displace one or more peripheral edges of the image formation device 70 by very small amounts, e.g., by an amount less than the size of the pixels, to create high-definition virtual digital images in the manner described below. The actuators displace the image formation device 70 by an amount equal approximately one-half of a pixel.

Figure 11:
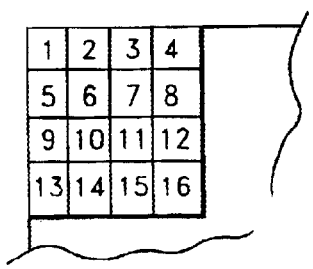
FIGS. 11, 11(a), 11(b), 11(c), and 11(d) illustrate schematically an array of pixels of a digital image formation device and illustrate one embodiment of a method for producing high-definition digital images.

Another aspect by which the quality of the prints produced from the virtual negative images is improved is illustrated by FIGS. 11, 11(*a*), 11(*b*), 11(*c*), and 11(*d*). FIG. 11 shows an enlarged view of the composition of a virtual negative image. As discussed above, the virtual negative image is formed by an array of pixels, arranged in rows and columns. The virtual negative image is produced with apparent high resolution by actuating, or off-setting, the array of pixels by a small amount. In one embodiment, the image formation device 70 is off-set by an amount equal to about one-half of a pixel. FIG. 11 shows a subset of the pixels in the array of pixels on the image formation device 70. The image formed on the image formation device 70 is divided into a first sub-image (FIG. 11(*a*)), a second sub-image (FIG. 11(*b*)), a third sub-image (FIG. 11(*c*)), and a fourth sub-image (FIG. 11(*d*)). In one embodiment, each of the four sub-images has a size about equal to the size of the image formation device 70 and which will be projected onto the photographic paper, as described below.

FIG. 11(*a*) shows the pixels that are displayed on the image formation device 70 when the image formation device 70 is in a first position, i.e., the first sub-image. In this position, the first sub-image comprises the pixels 1, 3, 9, and 11, which represent the pixels located in the odd columns and the pixels located in the odd rows. After these pixels are energized on the image formation device 70, the light beam is transmitted sequentially through each of the filters 94, 98, 102 on the filter wheel 80. The image formed by such pixels is projected thereby onto the photographic paper through each filter of the filter wheel 80, as discussed above. Three different overlapping images, which are colored with the three colors of these filters, are thereby provided on the photographic paper. After the three images have been so provided, the image formation device 70 is displaced by a very small amount to a second position, e.g., by a increment equal to about one-half pixel to the right of the first position in one embodiment. The displacement of the image formation device 70 can be accomplished by an actuator, as discussed above. Other embodiments are also possible. For example, in another embodiment, the image formed on the image formation device 70 is shifted one pixel to the right. Then an actuator is used to physically move the image formation device 70 to the left by an amount equal to about one-half of a pixel.

FIG. 11(*b*) shows the pixels that are displayed on the image formation device 70 when the image formation device 70 is in the second position, i.e., the second sub-image. In the second position, the second sub-image comprising even columns and odd rows, e.g., the pixels 2, 4, 10, 12, is displayed. As discussed above, these pixels will be positioned at a location that is one-half pixel laterally, e.g., to the right of the pixels of the first position. As in the first position, the light beam generated by the lamp 50 is directed through each of the filters 94, 98, 102 on the filter wheel 80 and through the image displayed on the image formation device 70 in the second position. The image displayed on the image formation device 70 will thus be projected onto the photographic paper. The three images formed on the image formation device 70 in the second position will thereby be formed on the paper and will overlap the previously formed images. After the image corresponding to the second position of the image formation device 70 is formed on the photographic paper, the image formation device 70 is displaced by a very small amount to a third position, e.g., by a increment equal to one-half pixel downward and one-half pixel laterally, to the left. The displacement of the image formation device 70 can be accomplished by an actuator, as discussed above. As discussed above, the image could alternatively be shifted on pixel downward on the image formation device 70, and then the image formation device could be physically moved one-half of a pixel upward so that the third sub-image is off-set from the first by about one-half of a pixel.

FIG. 11(*c*) shows the pixels that are displayed on the image formation device 70 when the image formation device 70 is in the third position, i.e., the third sub-image. In the third position, the third sub-image comprising odd columns and even rows, e.g., pixels 5, 7, 13, 15 is displayed. As discussed above, the pixels will be positioned at a location that is one-half pixel downward from the location of the pixels of the first sub-image. As in the first and second positions, the light beam is directed through each of the filters 94, 98, 102 on the filter wheel and through the image displayed on the image formation device 70 in the third position. The image displayed on the image formation device 70 in the third position will thereby be formed on the paper and will overlap the previously formed images. After the image corresponding to the third position of the image formation device 70 is formed on the paper, the image formation device 70 is displaced by a very small amount to a fourth position, e.g., by an increment equal to one-half pixel to the right of the third position. The displacement of the image formation device 70 can be accomplished by an actuator, as discussed above. As above, the image can alternatively be shifted on the image formation device 70 by one pixel downward and by one pixel to the right, then the image formation device can be physically moved to the left and upward by one-half of a pixel. As discussed above, this movement can be accomplished by employing the displacement actuator.

FIG. 11(*d*) shows the pixels that are displayed on the LCD device 70 when the LCD device 70 is in the fourth position. In the fourth position, the fourth sub-image comprising even columns and even rows, e.g., the pixels 6, 8, 14, 16, are displayed. As discussed above, these pixels will be positioned at a location that is one-half pixel laterally, e.g., to the right of, the pixels of the third position. As in the third position, the light beam is directed through each of the filters 94, 98, 102 on the filter wheel 80 successively and thereafter through the LCD device 70 in the fourth position.

In another embodiment, the image formation device 70 is moved to each of the four positions described above before the filter wheel 80 is advanced through each of the colored filters 94, 98, 102. That is, the filter wheel is first advanced so that the filter 94 is in the optical path of the light beam generated by the lamp 50. Then, the image formation device 70 is moved to each of the four positions described above in connection with FIG. 11(*a*)-FIG. 11(*d*) wherein the four sub-images are displayed on the image formation device 70. After all of the sub-images have been displayed, the filter wheel 80 is moved to the filter 98 and the image formation device 70 is moved through the four positions wherein all of the sub-images are displayed on the image formation device 70. Similarly, the filter wheel 80 is moved so that the colored filter 102 corresponds with the optical path of the light beam generated by the lamp 50. Then the image formation device 70 is moved through the four positions wherein all of the sub-images are displayed on the image formation device 70. The sub-images and filtered light combinations can be presented to the photographic paper in other orders within the scope of the invention, as will be understood by one skilled in the art.

As a result of these operations, the photographic paper is impressed with a series of overlapping colored images. The colored images are formed by the pixels of sub-images which are displaced by small increments, e.g., one-half pixel from each other. The very slight displacement of the image formation device 70 provides improved print quality of the virtual negative image.

Figure 11A:
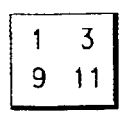
Figure 11B:
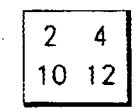
Figure 11C:
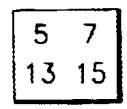
Figure 11D:
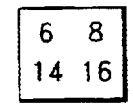

In another embodiment, FIG. 11 can be understood to represent locations on the photographic paper that correspond to the pixels and the intervening space between the pixels that would normally be exposed very little, if at all. In one embodiment, the locations at odd rows and at odd columns correspond to the pixels, while the locations at even columns or at even rows represent a space between the pixels. As a result, each location of FIG. 11 in this embodiment is spaced apart by a distance equal to about one-half of a pixel. To improve the quality of a photographic print, e.g., by improving color saturation of the print, the first sub-image of FIG. 11*a* is displayed on the image formation device 70 and is exposed to the photographic paper. In particular, all of the pixels on the image formation device 70 are energized. The pixels in the first position correspond to the locations 1, 3, 9, 11 on the photographic paper. This is the first sub-image shown in FIG. 11(*a*). The entire image on the image formation device 70 is then shifted one pixel to the right so that what was displayed on a pixel corresponding to location 1 is displayed in a pixel corresponding to location 3 and what was displayed on pixel corresponding to location 9 is displayed in pixel corresponding to location 11. In order to expose more fully the intervening space between the pixels 1 and 3 and between the pixels 9 and 11, the image formation device is physically moved one-half of a pixel to the left. Thus, the image displayed in the pixel corresponding to location 3 is now actually exposed on the photographic paper at a location 2. Similarly, the image displayed in pixel 11 is actually exposed on the photographic paper at a location 10. Thus, the second sub-image of FIG. 11(*b*) is exposed to the photographic paper.

After the second sub-image of FIG. 11(*b*) is exposed, the image formation device 70 can be returned to the first position and the entire image can be shifted on the image formation device 70 downward by one pixel. As a result, what was displayed on a pixel corresponding to location 1 is displayed in a pixel corresponding to location 9 and what was displayed on pixel corresponding to location 3 is displayed in pixel corresponding to location 11. In order to expose more fully the intervening space between the pixels 1 and 9 and between the pixels 3 and 11, the image formation device 70 is physically moved one-half of a pixel upward. Thus, the image displayed in the pixel corresponding to location 9 is now actually exposed on the photographic paper at a location 5. Similarly, the image displayed in a pixel corresponding to location 11 is actually exposed on the paper at a location 7. Thus, the third sub-image FIG. 11(*c*) is exposed to the photographic paper.

Similarly, after the third sub-image of FIG. 11(*c*) is exposed, the image formation device 70 can be returned to the first position and the entire image can be shifted on the image formation device 70 downward by one pixel and to the right by one pixel. As a result, what was displayed on a pixel corresponding to location 1 is displayed in a pixel corresponding to location 11. In order to expose more fully the intervening space between the pixels 1 and 11, the image formation device is physically moved one-half of a pixel upward and one-half pixel to the left. Thus, the image displayed in the pixel corresponding to location 11 is now actually exposed on the paper at a location 6. Similarly, other pixels are displayed at locations that correspond to a location on the photographic paper that is one-half of a pixel downward and to the right of the un-actuated position of the pixel. Thus the fourth sub-image of FIG. 11(*d*) is exposed to the photographic paper.

FIG. 12 shows a controller, or control circuit 188 that provides the electrical interconnection of components of the digital image processing system 10. In various embodiments, the control circuit 188 is located in the digital image handler 22, in the mini-lab controller 26, or partially in the digital image handler 22 and partially in the mini-lab controller 26. In one embodiment, the control circuit 188 is located on the circuit board 118 of the digital image handler 22. One skilled in the art will recognize that the control circuit 188 can be located elsewhere, e.g., in a dedicated housing.

The control circuit 188 includes a central processing unit (CPU) 190 that is electrically connected to many of the components described above and is adapted to control the operation of the digital image processing system 10. In one embodiment, the CPU 190 controls the color filtering device 80, the shutter 78, and the image formation device 70, among other components. The CPU 190 is powered by an external power supply 194. The CPU 190 is connected through an interface 198 to the personal computer 18, which is in turn connected with a data input device 202, e.g., a keyboard. An operator can enter data related to and/or controlling the digital image processing program.

The CPU 190 is connected to the pixel rounding-off device 82 through an interface 206. The CPU 190 is also connected to the motor 168, which drives the pixel rounding-off device 82, through an interface 208. The CPU 190 is connected to the displacement actuators (e.g., piezoelectric actuators) of the LCD device 70 via an interface 210. The CPU 190 is also connected to the color filtering device 80 through the interface 214. In one embodiment, where the color filtering device 80 is a filter wheel, an interface 216 connects the CPU 190 to the motor 104 that drives the filter wheel. As discussed above, the positioning of the filter wheel 80 can be controlled using a potentiometer 174, or other positioning sensor. An interface 218 connects the CPU 90 to the electromagnet 130, which actuates the shutter 78. The shutter 78 can also be connected to the CPU 90 directly via the interface 219. In one embodiment, where the image formation device 70 is a LCD display, an interface 226 connects the LCD to the personal computer 18 and to a video driver located therein. The LCD device is energized and controlled by the computer 18 through the interface 226. In another embodiment, the LCD device is energized and controlled by the CPU 190 through an interface 222. In another embodiment, the LCD is connected to the personal computer 18 via the interface 226 and to the CPU 190 via the interface 222. The interface 226 is also used in one embodiment to provide power to at least one of the electromagnet 130, the color filtering device 80, the image formation device 70, the motor 168 that drives the pixel rounding-off device 82, and the motor 104 that drives the color filtering device 80.

The serial cable 38 connects the CPU 190 to the mini-lab 14 via the mini-lab controller 26. For example, the CPU 190 is electrically connected to the lighting unit 48, a processing device 230 for feeding and handling photographic paper 234, and all other control and actuation components (not shown) of the digital image processing system 10. The processing device 230 delivers the photographic paper 234 to an exposure target 236. As used herein, "exposure target" refers to the location on the digital image processing system 10 where the photographic paper is positioned so that the light beam from the lamp 50 strikes the photographic paper so that the inverse of the virtual negative image can be formed thereon, as discussed above. A keyboard 238 is also connected to the CPU to receive user input, which sets and directs the operation of various component of the digital image processing system 10. The user can thereby obtain virtual digital images having the desired characteristics. The system 10 can thereby produce the desired digital photographic prints from these virtual digital images.

The above described system 10 is advantageous in that it is compatible with both professional and amateur mini-labs of virtually any type without requiring any modification thereof. Because the system 10 is compatible, as described above, it can be easily and quickly installed, thereby providing the capability to print digital color photographs without requiring extensive additional components or extensive reconfiguration of the existing mini-lab.

Although the present invention has been described in terms of certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A method of producing a photographic print from a virtual negative image stored in a source of virtual negative images, the virtual negative image comprising a plurality of pixels that are arrayed in a plurality of columns and a plurality of rows, the method comprising:

illuminating a light source included in a mini-lab, thereby directing a light beam along an optical path including therein a spatial light modulator coupled with the source of virtual negative images, said spatial light modulator comprising a plurality of pixels;

subdividing the virtual negative image into a plurality of sub-images such that a first sub-image comprises pixels of uneven columns and uneven rows, a second sub-image comprises pixels of even columns and uneven rows, a third sub-image comprises pixels of uneven columns and even rows, and a fourth sub-image comprises pixels of even columns and even rows;

forming an image of the plurality of pixels on an exposure target area;

rounding-off the image of the plurality of pixels with a pixel rounding-off device in the optical path of the light beam;

disposing a light-sensitive medium at said exposure target area;

positioning the spatial light modulator in a first position;

providing the first sub-image to the spatial light modulator;

exposing the exposure target area to the first sub-image using the light beam from the light source;

providing a first relative motion between the spatial light modulator and the exposure target, area from the first position to a second position that is distanced less than one pixel from the first position;

providing the second sub-image to the spatial light modulator;

exposing the exposure target area to the second sub-image by using the light beam from the light source;

providing a second relative motion between the spatial light modulator and the exposure target area from the second position to a third position that is distanced less than one pixel from the second position;

providing the third sub-image to the spatial light modulator;

exposing the exposure target area to the third sub-image by using the light beam from the light source;

providing a third relative motion between the spatial light modulator and the exposure target area from the third position to a fourth position that is distanced less than one pixel from the third position;

providing the fourth sub-image to the spatial light modulator; and exposing the exposure target area to the fourth sub-image by using the light beam from the light source.

2. The method of claim 1, wherein rounding-off the image of the plurality of pixels with the pixel rounding-off device comprises rotating inclined glass.

3. A digital processing system for producing photographic prints, the system comprising:
   a light source configured to direct a light beam along an optical path toward an exposure target area configured to receive a light sensitive medium;
   a spatial light modulator coupled with a source of virtual negative images, wherein a selected virtual negative image comprises a plurality of pixels that are arrayed in a plurality of columns and a plurality of rows, and wherein the selected virtual negative image is subdivided into a plurality of sub-images, including a first sub-image comprising pixels of uneven columns and uneven rows, a second sub-image comprising pixels of even columns and uneven rows, a third sub-image comprising pixels of uneven columns and even rows, and a fourth sub-image comprising pixels of even columns and even rows;
   a pixel rounding-off device in the optical path such that the light beam passes therethrough;
   a displacement actuator coupled with the spatial light modulator, the displacement actuator adapted to move the spatial light modulator with respect to the exposure target area by a distance that is less than one of the pixels into a number of positions corresponding to the plurality of sub-images; and
   a controller configured to sequentially expose the plurality of sub-images in correspondence to the relative motion of the displacement actuator.

4. The method of claim 3, wherein the pixel rounding-off device comprises a movable transmissive optical element.

5. The system of claim 3, further comprising a color filtering device positioned in the optical path.

6. The system of claim 3, further comprising a shutter movable from a first operating position wherein the light beam is blocked to a second operating position wherein the light beam is not blocked.

7. The system of claim 3, further comprising a heat filter.

8. The system of claim 3, further comprising a polarizing filter.

9. A digital processing system for producing photographic print, comprising:
   a light source adapted to direct a light beam along an optical path toward an exposure target area configured to receive a light sensitive medium;
   a spatial light modulator coupled with a source of virtual negative images and comprising a plurality of pixels;
   a displacement actuator coupled with the spatial light modulator, the displacement actuator adapted to move the spatial light modulator with respect to the exposure target area by a distance of less than one pixel; and
   a processor configured to provide a first sub-image of a selected virtual negative image to the spatial light modulator and a second sub-image of the selected virtual negative image to the spatial light modulator, wherein the first sub-image is shifted by at least one pixel with respect to the second sub-image.

10. The system of claim 9, further comprising a pixel rounding-off device in the optical path such that the light beam passes therethrough.

11. The system of claim 9, further comprising a color filtering device positioned in the optical path.

12. The system of claim 9, further comprising a shutter movable from a first operating position wherein the light beam is blocked to a second operating position wherein the light beam is not blocked.

13. The system of claim 9, further comprising a heat filter.

14. The system of claim 9, further comprising a polarizing filter.

15. A method of a producing a photographic print from a virtual negative image stored in a source of virtual negative images, the method comprising:
   illuminating a light source included in a mini-lab, thereby directing a light beam along an optical path including therein a spatial light modulator coupled with the source of virtual negative images and comprising a plurality of pixels;
   forming an image of the plurality of pixels on an exposure target area;
   disposing light-sensitive medium at said exposure target area;
   positioning the spatial light modulator in a first position;
   providing a first sub-image to the spatial light modulator, wherein the first sub-image corresponds to a first portion of the virtual negative image;
   exposing the exposure target area to the first sub-image using the light beam from the light source;
   providing relative motion between the spatial light modulation and the exposure target area, wherein the relative motion is less than one pixel;
   exposing the exposure target area to the second sub-image using the light beam from the light source.

16. The method of claim 15, wherein the first sub-image and the second sub-image are substantially similar.

17. The method of claim 15, wherein:
   providing the first sub-image to the spatial light modulator displays substantially all of the virtual negative image; and
   providing the second sub-image to the spatial light modulator displays substantially all of the virtual negative image shifted on the spatial light modulator by at least one pixel compared to the first sub-image.

18. The method of claim 15, wherein relative motion is about one-half of a pixel.

19. A digital image processing system for producing photographic prints, comprising:
   a light source adapted to direct a light beam along an optical path toward an exposure target area configured to receive a light sensitive medium;
   a spatial light modulator coupled with a source of virtual negative images and comprising a plurality of pixels;
   a displacement actuator coupled with the spatial light modulator, the the displacement actuator adapted to laterally translate the spatial light modulator with respect to the exposure target area; and
   processing logic in communication with said displacement actuator and said spatial light modulator, said processing logic configured to cause the translation of the displacement actuator a distance correspondence to at least one pixel on said spatial light modulator;
   wherein said processing logic is further configured to provide a first sub-image of a selected virtual negative image to the spatial light modulator and a second sub-image of the selected virtual negative image to the spatial light modulator, wherein the first sub-image is shifted with respect to the second sub-image by an amount larger than said distance that said displacement actuator is translated.

20. The system of claim 19, further comprising a pixel rounding-off device in the optical path such that the light beam passes therethrough.

21. The system of claim 19, further comprising a color filtering device positioned in the optical path.

22. The system of claim 19, further comprising a shutter movable from a first operating position wherein the light beam is blocked to a second operating position wherein the light beam is not blocked.

23. The system of claim 19, further comprising a heat filter.

24. The system of claim 19, further comprising a polarizing filter.

* * * * *